No. 830,155. PATENTED SEPT. 4, 1906.
P. M. KLING.
CAR BRAKE.
APPLICATION FILED SEPT. 30, 1905.
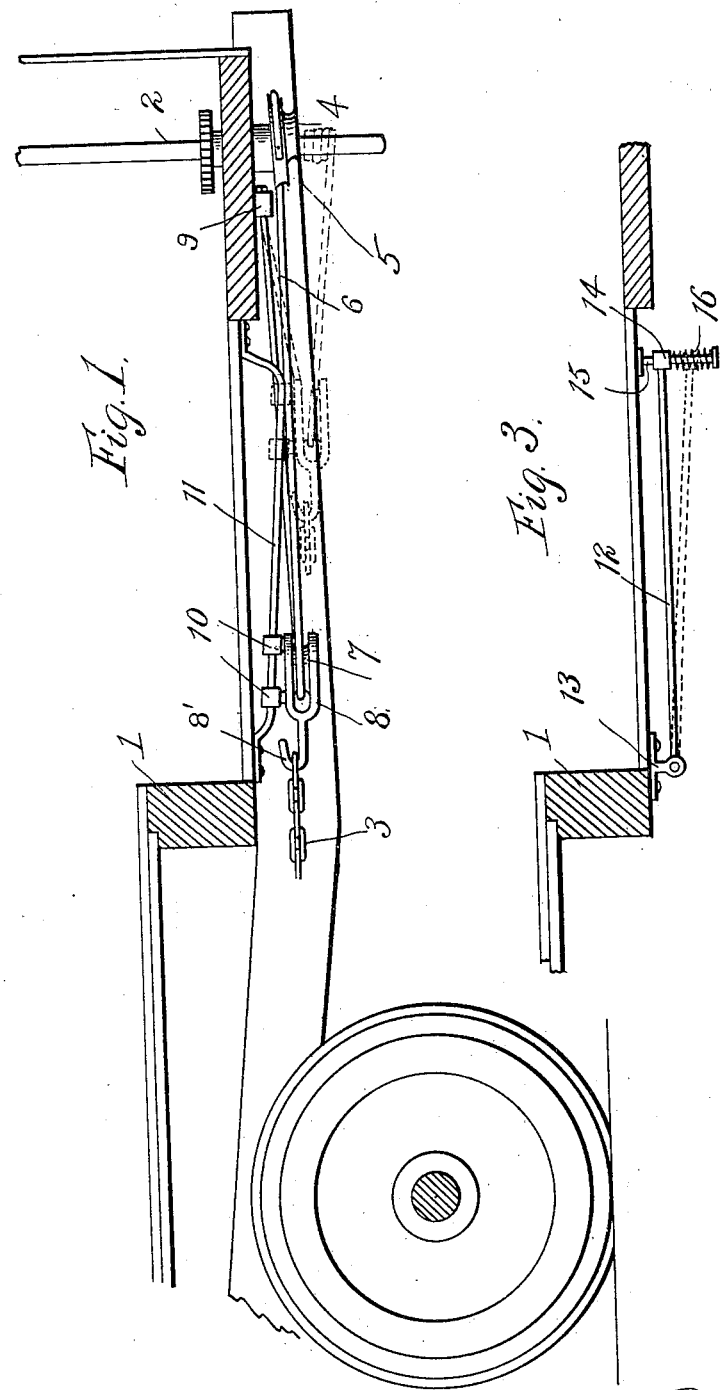
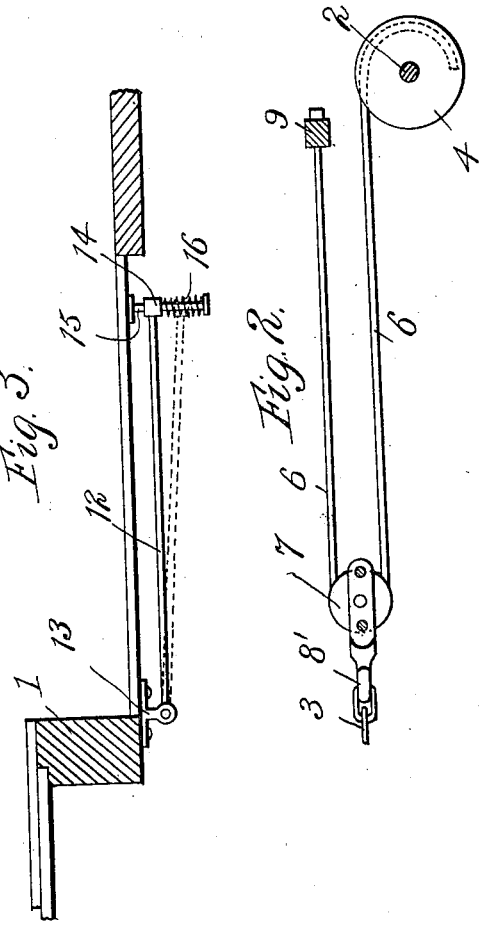

UNITED STATES PATENT OFFICE.

PETER M. KLING, OF ALLEGHENY, PENNSYLVANIA.

CAR-BRAKE.

No. 830,155.          Specification of Letters Patent.          Patented Sept. 4, 1906.

Application filed September 30, 1905. Serial No. 280,857.

*To all whom it may concern:*

Be it known that I, PETER M. KLING, a citizen of the United States, residing at Allegheny, county of Allegheny, in the State of Pennsylvania, have invented certain new and useful Improvements in Car-Brakes, of which the following is a specification.

My present invention relates to car-brakes, and has for its object to provide a simple expedient whereby the objectionable slack in the brake-chain extending from the brake chain or cable winding spindle or crank-shaft to the brake-beam or other applying medium may be largely done away with. Heretofore in brake construction there has existed between the winding-spindle and the brake-beam a considerable degree of slack in the brake chain or cable, which in many instances causes delay in the application of the brake.

In my present invention I do away with this objectionable feature without decreasing the working efficiency by making the brake chain or cable of relatively short lengths and by interposing a subbrake chain or cable actuating mechanism between the brake chain or cable proper and the crank-shaft or winding-spindle.

Such a mechanism is clearly described in the following specification and illustrated in the accompanying drawings, in which like reference characters refer to like parts, and in which—

Figure 1 is a sectional side elevation of a portion of a car structure supplied with my improved brake chain or cable subactuating means. Fig. 2 is a sectional plan view of the brake chain or cable subactuating means. Fig. 3 is a sectional side elevation of a modification in the form of guide for the pulley-block of my brake chain or cable subactuating mechanism.

Referring now in detail to the drawings, 1 represents a car-body; 2, a crank-shaft; 3, the brake chain or cable suitably connected to the brake-beam or other shoe-applying medium. (Not shown.) Heretofore in common types of brake mechanism the brake chain or cable has extended from, say, the brake-beam to the crank-shaft, the lower end of the crank-shaft 2 forming a winding-spindle upon which chain or cable 3 wound. In a construction made according to my present invention an inverted grooved rapid-take-up cone 4 is mounted on the lower end of shaft 2, on the base or upper end of which is attached at 5 a brake-chain-subactuating cable 6, passing over pulley 7 in pulley-block 8 and secured at the other end through suitable connections to car-body 1. The block 8 is secured, by means of hook 8', to brake chain or cable 3. The pulley-block 8 is provided with eye-lugs 10, which travel on an inclined guide 11, secured to the car-body 1.

In Fig. 3 is shown slight modifications in the form of guide for the pulley-block 8, wherein a guide 12 is pivotally secured at 13 to car-body 1 and has at its other end eye-lug 14, playing on a guide-pin 15, secured to the car-body 1. Guide-pin 15 carries a spring 16, secured against displacement from pin 15 and bearing against the under side of eye-lug 14 or other portions of guide 12.

The following is a brief description of the operation of my improved brake chain or cable subactuating mechanism.

The crank-shaft 2 being rotated cable 6 is wound upon the inverted cone 4, it taking, say, approximately, two revolutions of the cone 4 to wind cable 6 thereon, the balance of the winding being on the lower end of shaft 2. The cable 6 being passed over pulley 7 and secured at 9 to the frame 1, it is obvious that pulley-block 8 must give way and travel down guideway 11 as the cable 6 shortens. The pulley-block 8 being secured to brake-chain 3 exerts a pull on said chain or cable 3, which in the well-known manner applies the brake-shoes to the car-wheels, since by reason of the cone 4 winding cable 6 thereupon, the level of cable 6 changes, throughout the winding operation, it is necessary that guide 11 be inclined slightly toward the lower end of shaft 2 in order that cable 6 will wind properly upon said cone 4.

If desired, the guide for block 8 may be made as shown in Fig. 3, wherein the level of block 8, and hence the cable 6, is automatically adjusted. It is obvious that the cable 6 may be of any character, such as a chain or a wire rope.

In the apparatus hereinbefore described means are provided for rapidly bringing the shoes into engagement with the wheels, such means consisting in the rapid-take-up cone 4 on shaft 2. When the shoes are contacting with the car-wheels and great pressure is needed, the cable 6 is winding upon the lower end of shaft 2 of smaller diameter than cone 4, which gives increased leverage, and hence force of application. The interposition of the block and tackle or equivalent device between crank-shaft 2 and brake-chain 3 or other applying medium also increases the force of application one hundred per cent. Hence with the herein-described apparatus the shoes are rapidly brought into braking positions and applied with great force.

Having thus described my invention, the following is what I claim as new, and desire to secure by Letters Patent:

1. In brake mechanism, the combination with a controlling device and a brake-cable, of a traveling support for said cable, and a slanting guide for said support.

2. In brake mechanism, the combination with a controlling device and a brake-cable, of a pulley-block secured to said brake-cable, a cable carried by the pulley in said block secured at one end and winding at the opposite end on said controlling device, and a slanting guide for said pulley-block.

3. In brake mechanism, the combination with a controlling device and a rapid-take-up cone mounted thereon, of a brake-cable, a cable for actuating said brake-cable secured at one end and winding upon said rapid-take-up device at its other end, a pulley and block forming a connection between the two cables, eye-lugs on said pulley-block, and a guide-bar passing through said eye-lugs.

4. In brake mechanism, the combination with a controlling device, a brake-cable, and a rapid-take-up device on said controlling device, of a block-and-pulley connection between the rapid-take-up device and said brake-cable, and an automatically-adjustable guideway upon which said block travels.

PETER M. KLING.

Witnesses:
HARRY A. KNIGHT,
HARRY E. KNIGHT.